(12) United States Patent
Allert

(10) Patent No.: US 12,003,104 B2
(45) Date of Patent: Jun. 4, 2024

(54) ENERGY SUPPLY SYSTEM HAVING A COUPLING DEVICE

(71) Applicant: SMA Solar Technology AG, Niestetal (DE)

(72) Inventor: Claus Allert, Kaufungen (DE)

(73) Assignee: SMA Solar Technology AG, Niestetal (DE)

( * ) Notice: Subject to any disclaimer, the term of this patent is extended or adjusted under 35 U.S.C. 154(b) by 107 days.

(21) Appl. No.: 17/584,982

(22) Filed: Jan. 26, 2022

(65) Prior Publication Data

US 2022/0149620 A1    May 12, 2022

Related U.S. Application Data

(63) Continuation-in-part of application No. PCT/EP2020/071454, filed on Jul. 30, 2020.

(30) Foreign Application Priority Data

Aug. 6, 2019  (DE) ...................... 10 2019 121 241.3

(51) Int. Cl.
*H02J 3/00* (2006.01)
*H02J 3/32* (2006.01)
(Continued)

(52) U.S. Cl.
CPC .............. *H02J 3/0073* (2020.01); *H02J 3/32* (2013.01); *H02J 3/388* (2020.01); *H02J 9/062* (2013.01)

(58) Field of Classification Search
CPC .. H02J 3/0073; H02J 3/388; H02J 3/32; H02J 9/062
(Continued)

(56) References Cited

U.S. PATENT DOCUMENTS 9,331,523 B2 *   5/2016   Yamada ................. H02J 9/061
9,923,371 B1     3/2018   Emert et al.
(Continued)

FOREIGN PATENT DOCUMENTS

DE    202010008123 U1    10/2010
DE    102012023424 A1    6/2014
WO    2012101258 A1      8/2012

OTHER PUBLICATIONS

International Search Report dated Oct. 29, 2020 for International Application No. PCT/EP2020/071454.
(Continued)

*Primary Examiner* — Michael R. Fin
(74) *Attorney, Agent, or Firm* — Eschweiler & Potashnik, LLP

(57) ABSTRACT

A local power supply system having a grid transfer point for the connection of an energy supply grid has a first transmission line for transmitting electrical energy from the grid transfer point to a first terminal for connecting an arrangement of consumers, and a second transmission line for transmitting electrical energy between the grid transfer point and a second terminal for connecting an arrangement of energy stores. A first disconnector is arranged in the first transition line between the grid transfer point and the first terminal, and a second disconnector is arranged in the second transmission line between the grid transfer point and the second terminal. A coupling device, which electrically connects the first terminal and the second terminal, has a first switch and a second switch connected in series thereto, wherein a coupling element is arranged between the two switches connected in series, which coupling element has a grounding apparatus, a phase connection apparatus, a neutral conductor connection apparatus, a connection to a diesel generator and/or an apparatus for generating a neutral con-
(Continued)

ductor potential. The disclosure also relates to a method for operating such a system.

15 Claims, 4 Drawing Sheets

(51) Int. Cl.
*H02J 3/38* (2006.01)
*H02J 9/06* (2006.01)

(58) Field of Classification Search
USPC .......................................................... 307/64
See application file for complete search history.

(56) References Cited

U.S. PATENT DOCUMENTS

| | | |
|---|---|---|
| 2008/0203820 A1 | 8/2008 | Kramer et al. |
| 2009/0027932 A1 | 1/2009 | Haines et al. |
| 2015/0241894 A1* | 8/2015 | Bartlett .................... G05F 1/66 |
| | | 700/295 |
| 2015/0288224 A1 | 10/2015 | Allert et al. |
| 2018/0173180 A1* | 6/2018 | Frampton ............. F04B 35/045 |
| 2019/0326832 A1 | 10/2019 | Luger et al. |

OTHER PUBLICATIONS

Park et al. "DC Ring-Bus Microgrid Fault Protection and Identification of Fault Location" IEEE Transactions on Power Delivery, vol. 28, No. 4, Oct. 2013.

\* cited by examiner

ENERGY SUPPLY SYSTEM HAVING A COUPLING DEVICE

CROSS REFERENCE TO RELATED APPLICATIONS

This application is a continuation-in-part of International Patent Application number PCT/EP2020/071454, filed on Jul. 30, 2020, which claims priority to German Patent Application number 10 2019 121 241.3, filed on Aug. 6, 2019, and is hereby incorporated by reference in its entirety.

FIELD

The disclosure relates to a local energy supply system for the optional supply of consumers from a connected energy supply grid or an arrangement of energy stores. The disclosure furthermore relates to a method for operating a local energy supply system.

BACKGROUND

Emergency current systems, substitute current systems or backup systems secure grid-tied energy supply systems in the case of grid failure (i.e., enable them to continue to supply at least a portion of the connected loads, for example in accordance with predefined priorities). A series of switching operations must be executed for this purpose, for example, disconnection of the grid, starting up a grid former, and switching it into the supply lines. The state of the grid must furthermore be monitored in order, for example, to initiate a synchronization of the local generators when the grid returns, and in order to be able to connect the system to the grid again. These and many other requirements must be fulfilled, and their fulfillment is associated in different countries with highly varied guidelines, norms and standards.

The fulfillment of the requirements placed on the central grid and system protection in association with such emergency current systems, in particular, is complex and expensive. Thus in some countries, for example, a disconnection of all the poles of the supply lines is required before switching over to an emergency operating mode, whereas in other countries the disconnection of the neutral conductor is absolutely forbidden. As a result, a supplier of emergency current systems is faced with the problem of an enormous range of different product variants, and the costs entailed thereby. A harmonization, or at least a modular exchangeability of components in light of the country and the requirements, would be desirable.

Common backup systems with grid disconnectors are described in the prior art. Thus EP 2 668 705 81 B1 shows, in FIG. 1, a disconnecting device by means of which the transmission line can be divided into two sections that are electrically insulated from one another, namely a supply section and a discharge section. A grid former is provided in the discharge section to establish a local energy supply grid for the supply of an arrangement of consumers, after the grid has been disconnected by the disconnecting device. It is disadvantageous here that both the grid former (comprising a battery and an inverter) and the consumers are located in the same discharge section, as a result of which the disconnecting device must be dimensioned significantly larger, since it must be configured for the total maximum possible power.

DE 10 2012 113 016 B4 shows, in FIG. 1, a PV generator whose energy can be fed through the PV inverter and the grid disconnecting device into a higher-level energy supply grid. In the event of a grid failure, the local energy distribution grid is disconnected from the higher-level energy supply grid, and the grid substitute system establishes a local grid into which the PV inverter can continue to feed. Here again, consumers, generators and the backup system are arranged in the same supply line. Since stricter limits in relation to the permitted grid parameters (voltage, frequency) apply in many countries to feed equipment than to consumers, a disconnection from the grid may have to take place here, although the grid state would still enable operation of the consumers. This is a disadvantage.

SUMMARY

The present disclosure overcomes the above-described disadvantages, simplifies the fulfillment of requirements described further above, and specifies a local energy supply system that can be adapted more easily to the respective local specifications and conditions, and as a result makes it possible to produce backup systems that are more economical.

The present disclosure includes a local energy supply system that is connected to an energy supply grid via a grid transfer point, and comprises a first transmission line for transmitting electrical energy to an arrangement of consumers and a second transmission line for transmitting electrical energy from and to an arrangement of energy stores and the energy supply grid. The first transmission line is arranged between the grid transfer point and a first terminal to which the arrangement of consumers can be connected. A first disconnector is located in the first transmission line between the grid transfer point and the first terminal. The second transmission line is arranged between the grid transfer point and a second terminal to which an arrangement of energy stores can be connected. A second disconnector is located in the second transmission line between the grid transfer point and the second terminal. The local energy supply system further comprises a coupling device electrically connected to the first terminal and to the second terminal. The coupling device comprises a first switch and a second switch connected thereto in series.

A coupling element is connected between the two series-connected switches, which comprises at least one element from a group of apparatuses. This group of apparatuses comprises a grounding apparatus, a phase connecting apparatus, a neutral conductor connecting apparatus, a connecting apparatus to a diesel generator and an apparatus configured to generate a neutral conductor potential. The central disconnector that is usual in the prior art is divided in the disclosure into a disconnector for energy stores and a disconnector for loads. This is made possible by dividing the common transmission line into one transmission line each to these two arrangements. This is advantageous, since different requirements often apply to a disconnector for energy stores than apply to a disconnector for loads, as was already mentioned further above. Nevertheless, in a normal operating mode it is possible both to supply the consumers from the grid as well as to realize a local energy supply from the arrangement of energy stores, namely via both transmission lines.

In one embodiment, the local energy supply system according to the disclosure is suitable for connection to an arbitrary energy supply grid. By way of example, single-phase or three-phase grids, with or without a neutral conductor, as well as split-phase grids, may be mentioned here. The energy supply grid can be monitored via sensors at a point on the other side of the disconnectors, for example, at the grid transfer point, in order to detect a malfunction or failure of the grid. The values ascertained by the grid monitoring can be transmitted to a central control unit which can be located in the local energy supply system. The central control unit can, however, also be implemented as part of the converters/inverters that belong to the energy stores. If a malfunction/failure of the grid is detected, the first and the second transmission lines are disconnected via the first and the second disconnectors, respectively, which means that the arrangement of consumers and the arrangement of energy stores are disconnected from the energy supply grid. The respective switches can also be actuated by the central control unit. The disconnection from the energy supply grid is a precondition for the possibility of establishing a local, independent grid on the part of the arrangement of energy stores. The first switch and the second switch of the coupling device are closed for this purpose, so that a local grid is formed, and the arrangement of consumers is supplied by the arrangement of energy stores via the coupling device. To be able to establish a local grid, the battery inverter can, for example, be designed as a grid former, e.g., it is capable of independently establishing an island grid, here also referred to as backup operating mode.

In one embodiment, the arrangement of energy stores can comprise one or a plurality of energy stores, and similarly the arrangement of consumers can also comprise one or a plurality of consumers.

In one embodiment of the disclosure, the coupling device comprises a grounding apparatus between the two switches. Grounded neutral conductors are specified in some energy supply grids (star point grounding). Depending on where the neutral conductor was grounded for the normal operating mode, the grounding connection for the backup operating mode can be lost due to the disconnection from the grid. A grounding of the neutral conductor must then be realized in the backup operating mode. In one embodiment, this grounding of the neutral conductor is provided by the coupling element, which means that the coupling element can contain a fixed connection from the neutral conductor to ground (PE).

In one embodiment of the disclosure, the local energy supply system comprises the arrangement of energy stores. This can be advantageous if the arrangement of energy stores also comprises the central control unit or if the central control unit that is present in the local energy supply system also concomitantly controls the functions of the arrangement of energy stores.

In a further embodiment of the disclosure, the arrangement of energy stores comprises further energy generators which can supply energy from renewable energy sources. These can, for example, be photovoltaic, wind power or biogas plants. It can be advantageous here that the consumers can also be supplied from locally generated energy, and that this can take place both in the normal operating mode (in parallel with the energy supply grid) as well as in the backup operating mode (for example, in the event of grid failure). In the case of a longer grid failure, the consumers can be supplied with energy for longer, and in the event of an excess of energy, the battery can also be charged from the local energy generation plant.

In a further embodiment of the disclosure, the first switch of the coupling device is connected between the first terminal and the coupling element, and the second switch of the coupling device is connected between the second terminal and the coupling element. If the first transmission line comprises a first number of phase conductors—three, for example—and a neutral conductor the first switch can comprise a corresponding first number of switch contacts as well as a switch contact for the neutral conductor; in such example the first switch would thus have four contacts. This disconnection of all the poles is mandatory in a few countries.

In another embodiment of the disclosure, the first transmission line comprises a first number of phase conductors and a neutral conductor, the first switch comprises a corresponding first number of switch contacts and the neutral conductor is not switched by the first switch. Since disconnecting the neutral conductor is forbidden by the standards in some countries in North America, the first switch here in a "split phase" grid, as is usual there, would, for example, manage with two switch contacts, and the neutral conductor can be connected through.

In a further embodiment of the disclosure, the second transmission line comprises a second number of phase conductors and a neutral conductor, and the second switch comprises a corresponding second number of switch contacts as well as a switch contact for the neutral conductor.

If the first number of phase conductors is larger than the second number of phase conductors, the coupling element can comprise a phase connecting apparatus that connects multiple phase conductors of the first transmission line to a phase conductor of the second transmission line. Single-phase consumers that are connected to a first (three-phase, for example) transmission line can thus nevertheless be supplied from a, for example, single-phase arrangement of energy stores: the three phase conductors of the first transmission line are connected by the coupling element to the one phase conductor of the second transmission line.

In a further embodiment of the disclosure, the coupling element comprises a grounding apparatus that establishes a connection between the neutral conductor N and ground. In the backup operating mode, the ground connection of the neutral conductor can be lost due to the disconnection from the grid by the two disconnectors. In this case, it is usually desired or specified that the connection of the neutral conductor to the ground is re-established so that protective measures such as, for example, Residual Current Devices (RCD) (e.g. FI (current failure) switches) can take effect, in particular so the protective measures that are present in the grid operating mode can continue to be used in the backup case.

In a further embodiment of the disclosure, the first transmission line is implemented as a single-phase three-conductor grid ("split phase"), and the coupling element comprises an apparatus as an inductive voltage divider in the form of an autotransformer configured to generate a neutral conductor potential. In this way, an arrangement of energy stores with a two-phase phase conductor connection without a neutral conductor can be coupled to a "split phase" transmission line to supply the single-phase consumers.

In a further embodiment of the disclosure, the coupling element comprises a connecting apparatus to a diesel generator. In the backup case, this enables the diesel generator to be connected into the current supply of the consumers. The connecting apparatus can contain further switches for coupling to the generator when required. The term diesel generator should be understood here, in at least one embodiment, to be representative of generators that can generate alternating voltages using rotors driven by internal combustion engines.

Diesel generators are sometimes integrated into emergency power or backup systems when large amounts of energy are required in the backup case, for example, in order to be equipped for longer-lasting grid failures if the supply is not always ensured sufficiently, for example, using energy from regenerative sources. The generator is then started when needed (usually depending on the state of charge of the battery of the battery inverter), and synchronized with and connected to the system. When the battery again has a sufficient state of charge, the generator can be stopped again and disconnected.

This embodiment makes it possible that in the event of a failed grid and a battery system that is switched off or has failed and/or failure of the whole operational control of the energy supply system through actuation of the first switch with the generator voltage present at the coupling element, to supply the loads directly if, for example, the generator was started manually. The central neutral conductor grounding can also be successfully implemented in the emergency operating mode, and the safety measures for the electrical safety of the consumers (e.g., the use of fault current circuit breakers) remain capable of function.

This embodiment furthermore makes it possible that, for example, the consumers can be supplied with power from the generator while the energy stores are charged by a regenerative generator integrated into the arrangement of energy stores, in that the second switch is opened and the first is closed.

Due to the modular structure of the coupling device with the first and second switches and the coupling element, the local energy supply system according to the disclosure can easily be adjusted to regional conditions and specifications by adjusting the coupling element.

In one embodiment of the disclosure, the first disconnector, the second disconnector, the first switch and the second switch each comprise auxiliary contacts by which an electromechanical interlock is constructed such that required safety functions are ensured even when a central control unit fails. It holds true in one embodiment to interlock the grid disconnectors and the connection via the coupling device against one another, meaning that the grid disconnectors are open when the consumers are connected to the arrangement of energy stores via the coupling device. This can be realized through an actuation of the one relay by way of the auxiliary contacts of the "opposite number" relay necessary in each case for the interlock.

In one embodiment, the first switch and the first disconnector are in each case interlocked against one another, and the second switch and the second disconnector are interlocked against one another. This can be done in such a way that, for example, the disconnectors are conducted with the grid voltage via the respective actuating contact and the respective auxiliary contact (signal contact) of the associated switch. These auxiliary contacts are implemented such that the disconnector is closed when the grid voltage is present, the coupling switch is opened, and the auxiliary contact is thereby closed. The same applies conversely: in this case, the coupling switch is actuated with the island grid voltage (backup case) when simultaneously the associated disconnector is open, the auxiliary contact is thereby closed and the actuation signal has been activated. This ensures that in each case the disconnector or the coupling switch is closed, not both at the same time.

It is also possible as a result to connect the grid to the consumers via the first disconnector when the backup system is switched off and grid voltage is present.

In a further embodiment of the disclosure, the coupling element comprises a terminal for a generator. In this way, the generator is connected in during the backup operating mode. This is advantageous in the context of the electromechanical interlock described above. Thus, with the backup system switched off and without an energy supply grid being present, a generator can be started, for example, manually, and this can then be connected to the consumers via appropriate circuitry. It is now, however, necessary to ensure that this changeover to the generator is not automatically disconnected again when the energy supply grid is present, since this otherwise results in phase jumps (unsynchronized changeover) at the consumers, which could damage or destroy them. An electromechanical interlock can ensure that the generator must first be stopped and then the energy supply grid is connected to the consumers again.

In a further embodiment of the disclosure with a single-phase load connection, e.g., the arrangement of consumers is connected to an outer conductor and the neutral conductor, and a single-phase terminal of the arrangement of energy stores, the switches of the coupling device and of the two disconnectors can be implemented as two switch components, for example, as two contactors each with 4 contacts (2 normally closed and 2 normally open). The first disconnector and the first switch of the coupling device can thus be installed jointly in such a contactor, as can the second disconnector together with the second switch of the coupling device.

The disclosure also specifies a method for operating a local energy supply system to achieve the functionality described above. The local energy supply system here comprises a first transmission line configured to transmit electrical energy from a grid transfer point to a first terminal to which an arrangement of consumers can be connected, and a second transmission line configured to transmit electrical energy between the grid transfer point and a second terminal to which an arrangement of energy stores can be connected. A first disconnector is located in the first transmission line between the grid transfer point and the first terminal. A second disconnector is located in the second transmission line between the grid transfer point and the second terminal. The local energy supply system further comprises a coupling device electrically connected to the first terminal and to the second terminal, wherein the coupling device comprises a first switch and a second switch connected thereto in series, and a coupling element is arranged between the two series-connected switches. The local energy supply system further comprises a central control unit. The method comprises: for a normal operating mode, the first and the second disconnectors are closed by the central control unit and the two switches of the coupling device are opened, and for a backup operating mode, the first and the second disconnectors are opened by the central control unit and the two switches of the coupling device are closed, whereby the coupling element is activated. The activation of the coupling element solves the technical problem of the different statutory requirements between normal operating mode and backup operating mode, as described in detail further above.

In one embodiment of the method, the first and the second disconnectors and the two series-connected switches are switched simultaneously or concurrently. An interruption-free energy supply of the consumers can be realized hereby.

In one embodiment of the method, grid parameters of an energy supply grid are measured at the grid transfer point and are transmitted to the central control unit. The central control unit controls the opening and closing of the first and second disconnectors as well as of the two switches of the coupling device in accordance with the measured grid parameters.

BRIEF DESCRIPTION OF THE DRAWINGS

The disclosure is described below on the basis of example embodiments with reference to drawings from which, when considered in combination with the features of the claims, further features, properties and advantages of the disclosure emerge.

In the drawings.

DETAILED DESCRIPTION

The disclosure relates to what are known as emergency current systems, substitute current systems or backup systems, which secure grid-tied energy supply systems in the case of grid failure, i.e. enable them to continue to supply at least a portion of the connected loads, for example in accordance with predefined priorities. A series of switching operations must be executed for this purpose, for example disconnection of the grid, starting up a grid former, and switching it into the supply lines. The state of the grid must furthermore be monitored in order, for example, to initiate a synchronization of the local generators when the grid returns, and in order to be able to connect the system to the grid again. These and many other requirements must be fulfilled, and their fulfillment is associated in different countries with highly varied guidelines, norms and standards.

Figure 1:
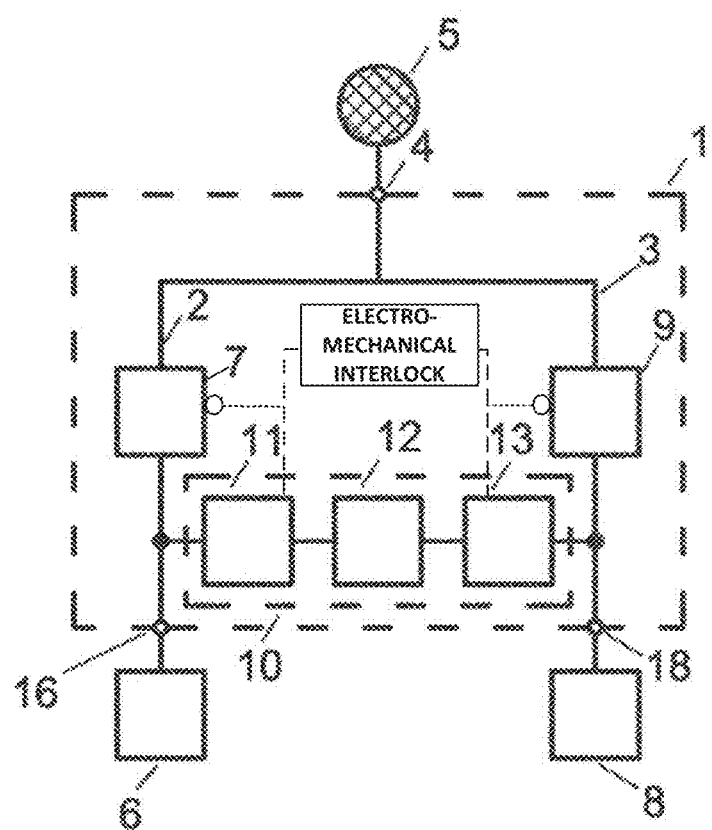
FIG. 1 shows a schematic illustration of a local energy supply system according to the disclosure with units connected thereto.

FIG. 1 shows schematically a local energy supply system 1 that is connected by way of a grid transfer point 4 to an energy supply grid 5. A first transmission line 2 for transmitting electrical energy leads from the grid transfer point 4 to a first terminal 16. An arrangement of consumers 6 can be connected to the first terminal 16. A first disconnector 7 is located in the first transmission line 2 between the grid transfer point 4 and the first terminal 16. A second transmission line 3 extends between the grid transfer point 4 and a second terminal 18. An arrangement of energy stores 8 can be connected to the terminal 18. Energy can be exchanged bidirectionally via the second transmission line 3 between the energy supply grid 5 and the arrangement of energy stores 8. A second disconnector 9 is located in the second transmission line 3 between the grid transfer point 4 and the second terminal 18. A coupling device 10 is electrically connected to the first terminal 16 and the second terminal 18. The coupling device 10 comprises a first switch 11 and a second switch 13 connected to it in series. A coupling element 12 is arranged between the two series-connected switches 11, 13. The coupling device 10 is connected to the first transmission line 2 between the first disconnector 7 and the first terminal 16 and to the second transmission line 3 between the second disconnector 9 and the second terminal 18.

Figure 2:
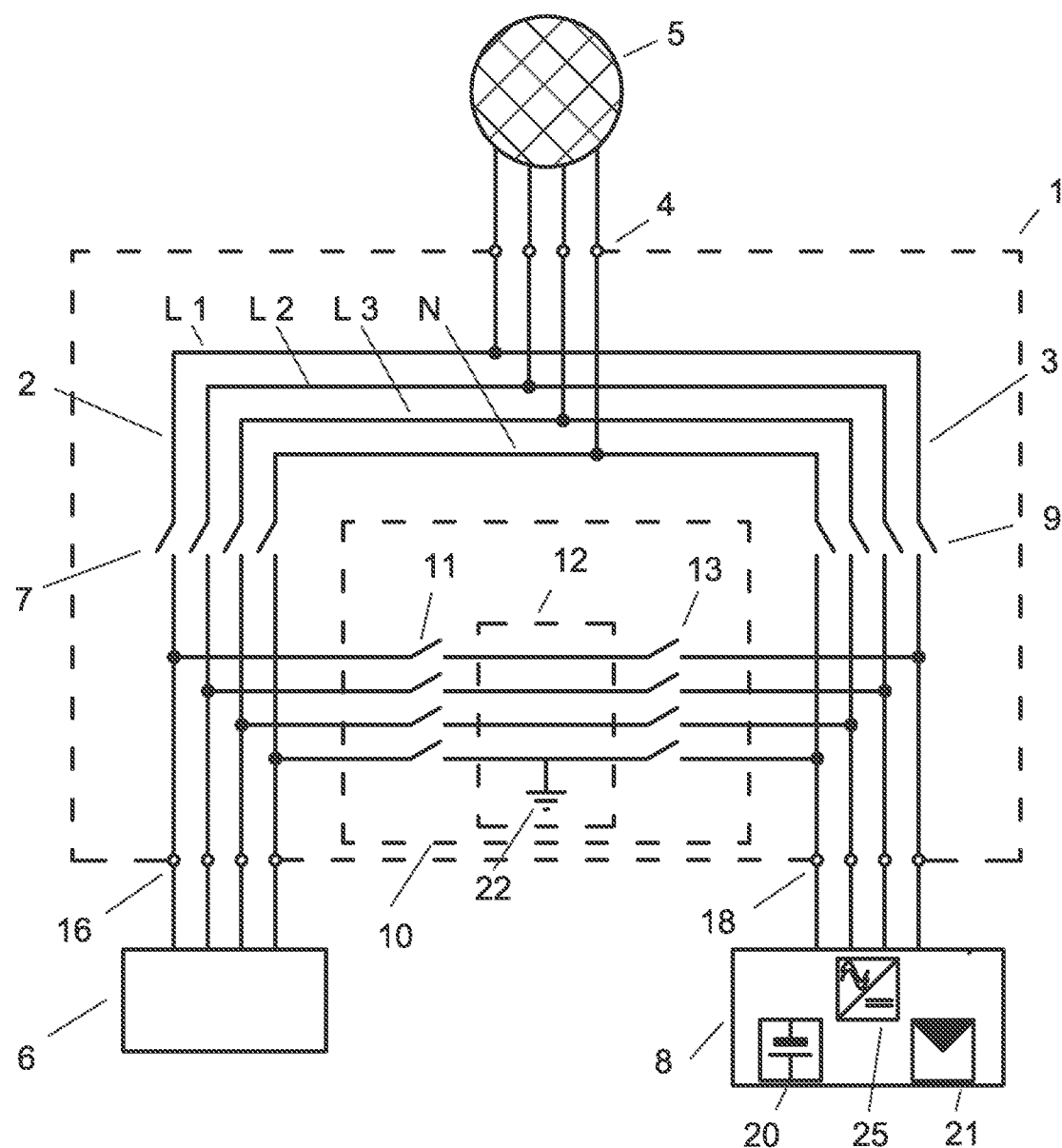
FIG. 2 shows an example embodiment of an energy supply system according to the disclosure.

FIG. 2 shows the local energy supply system 1 of FIG. 1 according to one embodiment. The energy supply grid 5 is implemented here as a three-phase grid with phase conductors L1, L2, L3 and a neutral conductor N. In a normal operating mode, the first and second disconnectors 7 and 9 are closed, and the first and second switches 11 and 13 are open; in this operating state, the coupling element 12 has no effect. The arrangement of consumers 6 is supplied from the energy supply grid 5. The arrangement of energy stores 8 can be charged from the energy supply grid 5 or can feed energy into the energy supply grid 5, for example, to provide grid services. In one embodiment of the disclosure, the arrangement of energy stores 8 comprises a battery 20 and generators 21. The generators 21 can, in one embodiment, comprise regenerative energy sources. The generators 21 and the battery 20 can each comprise independent converters 25 or can be operated using a common converter 25. Heat and power cogeneration units with power-heat coupling, operated, for example, with biogas, can also be incorporated into the arrangement of energy stores 8 as generators 21; it may be the case that these do not then require a converter.

If the energy supply grid 5 is disturbed, for example, if a grid frequency lies above a limit permissible for the generators and the battery, the second disconnector 9 is opened in order to disconnect the arrangement of energy stores 8 from the energy supply grid 5. The arrangement of consumers 6 can, as a rule, continue to be operated at the energy supply grid 5. The first disconnector 7 can therefore remain closed in one embodiment. In spite of the disconnection from the energy supply grid 5, the battery 20 can be charged within the arrangement of energy stores 8 by the generators 21 in one embodiment.

If the energy supply grid 5 has failed, for example, if the grid voltage falls below a permissible limit, the first disconnector 7 can also be opened in addition to the second disconnector 9, in order to initiate the backup operating mode. After opening the first disconnector 7, the second switch 13 of the coupling device 10 can first be closed, in order to connect the coupling element 12, which is implemented in this embodiment as a grounding apparatus 22, to the arrangement of energy stores 8. A star point grounding can hereby be established for the arrangement of energy stores 8, which permits the use of protective devices for the arrangement of consumers 6 after closing the first switch 11. This may thus be mandatory regionally. After closing the first switch 11, the arrangement of consumers 6 can be supplied with energy from the arrangement of energy stores 8. The arrangement of energy stores 8 contains at least one grid former (not shown); this function can, for example, be assumed by the converter 25 of the battery 20. This means that the converter 25 can independently establish an island grid in one embodiment.

In one embodiment, the state of the grid is acquired by sensors at the grid transfer point 4 and transmitted to a central controller (not shown). This controller can be located in the grid former or else may be part of the local energy supply system 1.

If the energy supply grid 5 has again been returned to a state that permits a supply of energy to the arrangement of consumers 6, a return to the normal operating state can be initiated. The grid former is synchronized for this purpose to frequency, phase angle and voltage of the grid 5. The values of the sensors that have been transmitted can be used for this purpose. The first disconnector 7 can now be closed and, at the same time or previously, the first switch 11 can be opened in order to supply the arrangement of consumers 6 from the energy supply grid 5.

If the conditions for the operation of the arrangement of energy stores 8 are also fulfilled, the second switch 13 can also be opened and thereafter or simultaneously, the second disconnector 9 can be closed. In one embodiment, these conditions can include limits relating to the grid voltage and frequency which must be maintained within specified time periods. It is also alternatively possible for all the switches described above to be switched simultaneously in the manner described for an interruption-free changeover.

Local energy supply systems that are known hitherto have often been implemented with a switch in the connection between the neutral conductor N and ground. This must be elaborately monitored or the switch arrangement itself is elaborate. This is simplified, in accordance with one embodiment, through the use of the coupling element 12, since the connection between the neutral conductor N and ground is permanently installed and is also automatically connected correctly during the connecting procedure for the backup operating mode. An additional benefit arises as a result of the possibility of connecting the arrangement of consumers 6 to the energy supply grid 5 and to supply the arrangement therefrom, even when the conditions for the connection of the energy store arrangement 8 is not, or not yet, fulfilled.

Figure 3:
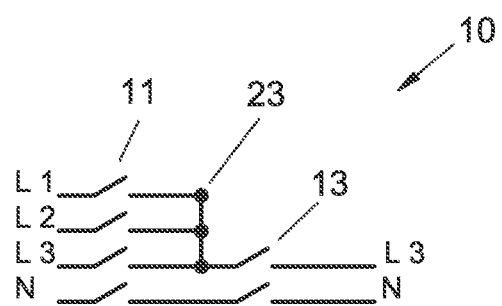
FIG. 3 shows an example embodiment of a coupling element according to the disclosure.

FIG. 3 shows an embodiment according to the disclosure of a coupling device 10 for use in FIG. 1, for example. The first transmission line 2 here is equipped with three phase conductors L1, L2, L3 and one neutral conductor N. The second transmission line 3, and thereby also the terminal 18, through which the arrangement of energy stores 8 feed into the local energy supply system, is implemented with a single phase (here connected to L3, by way of example). In this embodiment, the coupling element 12 comprises a phase connecting apparatus 23. In the event of grid failure, the consumers distributed over the phase conductors L1, L2, L3 can be supplied from the single-phase arrangement of energy stores 8 when connected via the first and second switches 11, 13 and the phase connecting apparatus 23.

Figure 4:
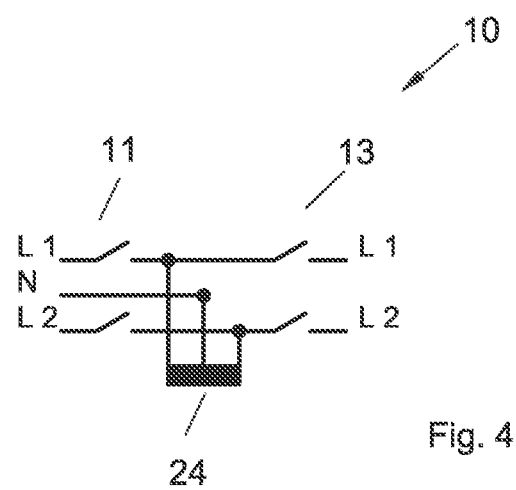
FIG. 4 shows a further example embodiment of a coupling element according to the disclosure.

FIG. 4 shows a further embodiment according to the disclosure of a coupling device 10 that can be used in FIG. 1. In this embodiment, the coupling element 12 has an apparatus 24 configured to generate a neutral conductor potential in the form of an autotransformer. The first transmission line 2 is implemented with two phase conductors L1, L2 and one neutral conductor N for a single-phase three-conductor grid. The second transmission line 3, and thereby also the terminal 18, through which the arrangement of energy stores 8 can feed into the local energy supply system 1, is implemented here with two phases without a neutral conductor N. For this reason, a neutral conductor potential is generated in the backup operating mode by the apparatus 24. In some instances, this is required for the connection of single-phase consumers between one phase and the neutral conductor N. It is furthermore assumed in this embodiment that switching the neutral conductor N is forbidden by regulations, for which reason the first switch 11 is equipped with two switch contacts for the two phase conductors L1, L2.

What is claimed is:

1. A local energy supply system with a grid transfer point for connecting to an energy supply grid, comprising:
   a first transmission line configured to transmit electrical energy from the grid transfer point to a first terminal that is configured to connect to an arrangement of consumers, wherein a first disconnector is located in the first transmission line between the grid transfer point and the first terminal,
   a second transmission line configured to transmit electrical energy between the grid transfer point and a second terminal that is configured to connect to an arrangement of energy stores, wherein a second disconnector is located in the second transmission line between the grid transfer point and the second terminal,
   a coupling device electrically connecting the first terminal and the second terminal, wherein:
      the coupling device comprises a first switch and a second switch connected together in series, and a coupling element arranged between the series-connected first and second switches, wherein the coupling element comprises at least one element from the following group:
         a grounding apparatus,
         a phase connecting apparatus configured to connect multiple phase conductors of the first transmission line to a single phase conductor of the second transmission line,
         a connecting apparatus to a diesel generator, and
         an apparatus configured to generate a neutral conductor potential,
   a central control unit configured to:
      close the first disconnector and the second disconnector in a normal operating mode, and open the first switch and the second switch of the coupling device in the normal operating mode, and
      open the first disconnector and the second disconnector in a backup operating mode, and close the first switch and the second switch of the coupling device in the backup operating mode, thereby activating the coupling element.

2. The local energy supply system as claimed in claim 1, wherein
   the arrangement of energy stores forms a constituent part of the local energy supply system.

3. The local energy supply system as claimed in claim 1, wherein
   the arrangement of energy stores comprises energy generators from renewable energy sources.

4. The local energy supply system as claimed in claim 1, wherein
   the first switch is connected between the first terminal and the coupling element, and the second switch is connected between the second terminal and the coupling element.

5. The local energy supply system as claimed in claim 4, wherein
   the first transmission line comprises a first number of phase conductors and a neutral conductor, and the first switch comprises a corresponding first number of switch contacts as well as a switch contact for a neutral conductor.

6. The local energy supply system as claimed in claim 4, wherein
   the first transmission line comprises a first number of phase conductors and a neutral conductor, and the first switch comprises a corresponding first number of switch contacts and a neutral conductor is not switched by the first switch.

7. The local energy supply system as claimed in claim 1, wherein
   the second transmission line comprises a second number of phase conductors and a neutral conductor, and the second switch comprises a corresponding second number of switch contacts as well as a switch contact for a neutral conductor.

8. The local energy supply system as claimed in claim 1, wherein
   the coupling element comprises a grounding apparatus configured to establish a connection between a neutral conductor and ground.

9. The local energy supply system as claimed in claim 5, wherein the second transmission line comprises a second number of phase conductors and a neutral conductor, and the second switch comprises a corresponding second number of switch contacts as well as a switch contact for a neutral conductor, and wherein
the first number is larger than the second number and the coupling element comprises a phase connecting apparatus that connects multiple phase conductors of the first transmission line to a phase conductor of the second transmission line.

10. The local energy supply system as claimed in claim 1, wherein
the first transmission line is configured for a single-phase three-conductor grid, and the coupling element comprises an autotransformer configured to generate a neutral conductor potential.

11. The local energy supply system as claimed in claim 1, wherein the first disconnector, the second disconnector, the first switch and the second switch each comprise auxiliary contacts, and wherein an electromechanical interlock is constructed by the auxiliary contacts such that required safety functions related to a changeover into a backup operating mode are ensured even upon failure of the central control unit.

12. The local energy supply system as claimed in claim 11, wherein
the coupling element comprises a terminal for a generator.

13. A method for operating a local energy supply system, comprising
a first transmission line configured to transmit electrical energy from a grid transfer point to a first terminal that is configured to connect to an arrangement of consumers, wherein a first disconnector is located in the first transmission line between the grid transfer point and the first terminal,
a second transmission line configured to transmit electrical energy between the grid transfer point and a second terminal that is configured to connect to an arrangement of energy stores, wherein a second disconnector is located in the second transmission line between the grid transfer point and the second terminal,
a central control unit, and
a coupling device electrically connected to the first terminal and to the second terminal,
wherein the coupling device comprises a first switch and a second switch connected together in series, and a coupling element connected between the series-connected first and second switches, wherein the coupling element comprises at least one element from the following group:
a grounding apparatus,
a phase connecting apparatus configured to connect multiple phase conductors of the first transmission line to a single phase conductor of the second transmission line,
a connecting apparatus to a diesel generator, and
an apparatus configured to generate a neutral conductor potential, and
wherein the method, comprises:
closing the first disconnector and the second disconnector by the central control unit in a normal operating mode, and opening the first and second switches of the coupling device by the central control unit in the normal operating mode,
opening the first disconnector and the second disconnector by the central control unit in a backup operating mode, and closing the first and second switches of the coupling device by the central control unit in the backup operating mode, thereby activating the coupling element.

14. The method for operating the local energy supply system as claimed in claim 13, wherein
the first and the second disconnectors and the two series-connected switches are switched simultaneously.

15. The method for operating a local energy supply system as claimed in claim 13, further comprising:
measuring grid parameters of an energy supply grid at the grid transfer point, and transmitting the measured grid parameters to the central control unit, and
controlling an opening and closing of the first and second disconnectors as well as of the first and second switches of the coupling device using the central control unit based on the measured grid parameters.

* * * * *